Patented Apr. 11, 1939

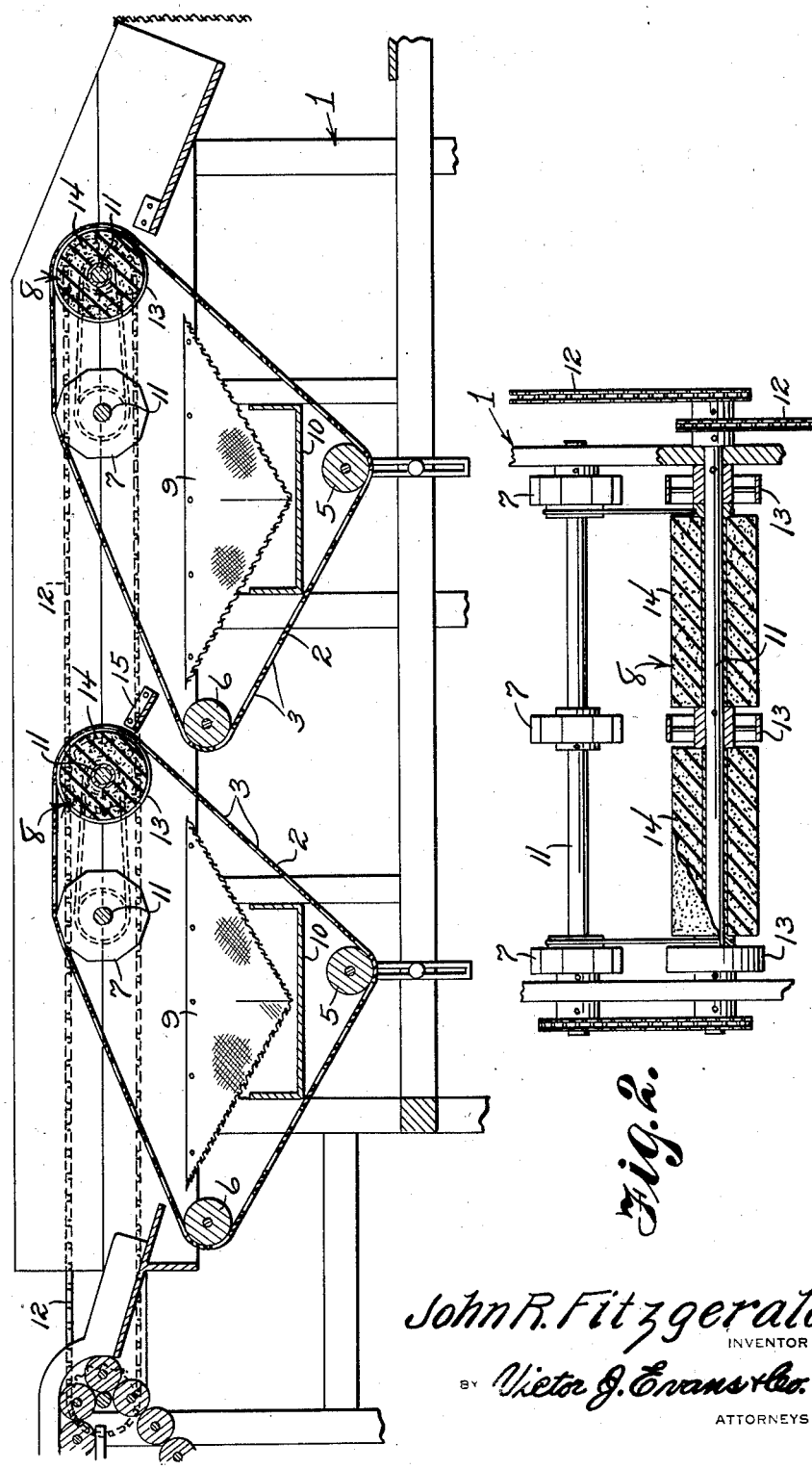

2,153,688

UNITED STATES PATENT OFFICE 2,153,688

VEGETABLE OR FRUIT GRADING AND SIZING MACHINE

John R. Fitzgerald, Harlingen, Tex.

Application August 23, 1937, Serial No. 160,509

4 Claims. (Cl. 209—84)

This invention relates to improvements in vegetable or fruit grading machines forming the subject matter of Patent 2,039,688, issued to me on May 5, 1936, and has for the primary object the provision of means for supporting the grading belts to obtain better results in the grading operation of the fruit or vegetable and said improvements includes means for automatically removing and passing onto the next grading belt fruit or vegetables which may lodge in the grading openings of the preceding belt just prior to the grading openings of the latter-named belt passing from grading position to non-grading position so that the grading openings of the belts will not clog and which eliminates manual attention during the operation of the machine.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a fragmentary vertical sectional view showing a fruit or vegetable grading machine having the improvement applied thereto and constructed in accordance with my invention.

Figure 2 is a fragmentary plan view showing ejector rollers for removing lodged fruit or vegetables from the grading belt.

Referring in detail to the drawing, the numeral 1 indicates generally a fruit or vegetable grading machine forming the subject matter of the patent heretofore referred to wherein a plurality of endless grading belts 2 are employed one after the other and each belt having openings 3 of a selected size. The belts are so mounted on rollers 5, 6, 7 and 8 that one run of the belt inclines forwardly and upwardly and on which the fruit or vegetables are deposited for grading, the fruit or vegetables of a certain size passing through openings and falling into hoppers 9 and discharge troughs 10 while large fruit is discharged therefrom onto another belt for further grading. A machine of this character has been successfully employed, however, to improve its operation the present invention is adapted thereto which consists of the rollers 7 and 8 mounted on shafts 11 connected together by endless chains so that said shafts will rotate at the same rate of speed from the power chain 12. Each roller 7 consists of several parts and each part of substantially octagon shape to contact the grading belt when the grading run thereof reaches the upper end of the grading position. The roller 8 includes circular shaped parts 13 to contact the grading belt after it leaves the roller 7 and are supported by one of the shafts 11. Journaled on the latter-named shaft between the parts 13 are ejector rollers 14, the diameter of which is slightly less than the diameter of the parts 13 of the roller 8 so as not to contact the grading belt, however, to be disposed in close proximity thereto so that any fruit or vegetable which may lodge in an opening of the grading belt and follow the last past the rollers 7 will be ejected. The ejected fruit is delivered onto the next grading belt by an inclined chute 15. The ejector rollers 14 are preferably constructed of soft rubber so as not to damage the fruit while ejecting the same from an opening of the grading belt. The rollers 14 are belted to the shaft of the roller 7 and are rotated at a slightly faster speed than the roller 7.

What is claimed is:

1. In a machine for grading vegetables, fruit and the like, an endless grading belt having openings of selected size therein, the upper flight of said belt constituting the working portion for grading the articles deposited thereon, the receiving and discharge end portions of the flight being roller supported, agitator roller means supporting the upper flight of the belt between the receiving and discharge ends thereof, and a soft bodied resilient ejector roller of lesser diameter than the belt supporting roller at the discharge end of the upper flight of the belt, said ejector roller rotating about the axis of the supporting roller and in the same direction but at a greater peripheral speed than the travel of the grading belt on said supporting roller.

2. In a machine for grading vegetables, fruit and the like, an endless grading belt having openings of a selected size therein, the openings being arranged in spaced rows, the upper flight of the belt receiving the articles to be graded thereon and being supported at its receiving and discharge ends by aligned rollers out of the paths of the openings in the belt, correspondingly aligned agitator rollers supporting the belt between the end supporting rollers of the upper flight, and soft bodied resilient ejector rollers of lesser diameter than the belt supporting rollers at the discharge end of the upper flight of the belt, said ejector rollers rotating about the same axis as the adjacent belt supporting rollers in the same direction but at a greater peripheral speed than the grading belt.

3. In a grading machine of the character described, an endless grading belt having spaced rows of grading openings of selected size therein, the upper flight of said belt receiving thereon the articles to be graded, said upper flight extending upwardly and forwardly from its receiivng end and being supported at its receiving and discharge ends on aligned rollers out of the paths of the grading openings in the belt, correspondingly aligned agitator rollers located between the end supporting rollers of the upper flight of the belt, said agitator rollers supporting the belt adjacent the supporting rollers at the discharge end of the flight with the portion of the flight therebetween substantially horizontal, and soft bodied resilient ejector rollers located between the supporting rollers at the discharge end of the upper flight of the grading belt in the paths of the openings in the belt, said ejector rollers being of lesser diameter than the adjacent belt supporting rollers and rotating about the same axis and in the same direction as said belt supporting rollers but at a greater peripheral speed than the belt.

4. In a grading machine of the character described, an endless grading belt having spaced rows of openings of selected size therein, the upper flight of said belt receiving the articles to be graded thereon, said belt extending upwardly and forwardly from its receiving end and being supported at its receiving and discharge ends on aligned transversely spaced rollers out of the paths of the openings in the belt, correspondingly aligned spaced agitator rollers located between the end supporting rollers of the upper flight of the belt, said agitator rollers having polygonal circumferential faces supporting the belt at the upper end of the inclined portion of the upper flight, the portion of the upper flight between said agitator rollers and the supporting rollers at the discharge end of the flight being horizontal, and soft bodied resilient ejector rollers located transversely between the belt supporting rollers at the discharge end of the upper flight of the belt, said ejector rollers being of lesser diameter than the adjacent belt supporting rollers and rotated about the same axis as said belt supporting rollers.

JOHN R. FITZGERALD.